(12) United States Patent
Ratliff et al.

(10) Patent No.: US 7,456,595 B2
(45) Date of Patent: Nov. 25, 2008

(54) METHOD AND APPARATUS FOR ADAPTIVE CONTROL OF A DISK DRIVE IN THE PRESENCE OF NON-LINEAR MAGNETIC BIAS

(75) Inventors: Ryan Todd Ratliff, O'Fallon, MO (US); Prabhakar R. Pagilla, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 329 days.

(21) Appl. No.: 11/406,177

(22) Filed: Apr. 18, 2006

(65) Prior Publication Data

US 2007/0007921 A1   Jan. 11, 2007

Related U.S. Application Data

(60) Provisional application No. 60/672,351, filed on Apr. 18, 2005.

(51) Int. Cl.
*G05B 11/01* (2006.01)

(52) U.S. Cl. .................. 318/560; 318/432; 318/434
(58) Field of Classification Search ............ 318/560, 318/432, 434, 400.16
See application file for complete search history.

(56) References Cited

U.S. PATENT DOCUMENTS

| 4,947,274 A | 8/1990 | Casey et al. |
| 5,023,736 A | 6/1991 | Kelsic et al. |
| 5,541,792 A | 7/1996 | Kinoshita et al. |
| 5,734,527 A | 3/1998 | Reinhart |
| 2005/0073769 A1 | 4/2005 | Lee et al. |

*Primary Examiner*—Rina I Duda
(74) *Attorney, Agent, or Firm*—Fellers, Snider, Blankenship, Bailey & Tippens

(57) ABSTRACT

According to a preferred aspect of the instant invention, there is provided a system and method of moving a disc drive arm in the presence of nonlinear magnetic bias. Further, in another preferred embodiment the instant method will be adaptive and/or self-corrective and is especially useful when used with disc drive hardware other than the hardware that was used to model the control law.

17 Claims, 5 Drawing Sheets

METHOD AND APPARATUS FOR ADAPTIVE CONTROL OF A DISK DRIVE IN THE PRESENCE OF NON-LINEAR MAGNETIC BIAS

RELATED APPLICATIONS

This application claims the benefit of U.S. Provisional Patent Application Ser. No. 60/672,351, filed on Apr. 18, 2005, the disclosure of which is incorporated herein by reference as if fully set out at this point.

FEDERALLY SPONSORED RESEARCH

The Government of the United States of America has certain rights in this invention pursuant to Grant No. CMS-9982071 awarded by the National Science Foundation.

TECHNICAL FIELD

This invention relates to the general subject of suppression of unwanted resonant dynamics in a flexible dynamic system and, as a specific example of an application of the instant invention, suppression of unwanted resonant dynamics in a disc drive arm.

BACKGROUND OF THE INVENTION

The read/write heads of a hard disc drive are very sensitive to external shock and vibration. As is well known to those of ordinary skill in the art, shock and vibration dynamics can cause head/disc impact. If the impact occurs in the area of the disc where data is stored, data loss or permanent damage can occur. Typically, there is a maximum shock and vibration specification limit that corresponds to a given head design. Shock specifications are typically given for both operational and non-operational states. Disc drives will typically see higher shock levels during the non-operational state primarily resulting from shipping and handling.

Modern designs incorporate latching or locking mechanisms to hold the actuator arm at a specific position when the drive is not in operation. This allows higher non-operational dynamics to be tolerated and prevents a fatal event, caused by a drop or careless handling that would physically damage the drive. Most current latch designs are passive and require external sources of mechanical energy. For example, certain latch designs take advantage of the high velocity airflow generated by the spinning discs for actuation. Other designs rely on the inertia of a separate member that moves when a shock is imparted to the drive.

Air vane and inertial style latches are likely the most commonly used latches in industry today. Both styles are preferred for their high shock resistance capabilities. Inertial latches are common in drives sized for notebook computers and consumer electronics. The latch consists of a separate inertial member rotating about a designated pivot point. Both the pivot location and inertia of the member are designed so that the member engages the actuator arm in a finite time under the influence of a specified shock. The engagement contact effectively blocks actuator motion and prevents the read/write heads from moving into the data zone. The timing of this engagement can become problematic, inconsistent, or even impossible if wide ranges of shock resistance are required. For example, the latch design may meet a specified upper amplitude limit at the expense of lower amplitudes. Those of ordinary skill in the art will recognize that it is possible for inertial latches to engage the actuator at higher shock amplitudes, but "miss" at lower amplitudes.

Air latches are typically found in desktop and server drives where larger disc sizes and higher spindle speeds provide stronger airflow currents. In a typical configuration, opposite the air vane will be an engagement feature that keeps the actuator arm locked in shipping position when the drive is off. When power is applied to the drive, force is applied to the latch vane as a result of the airflow from spinning discs. The latch overcomes the return bias and stays open as long as power is applied and the discs are spinning.

However, the use of air latches is not without problems. For example, disc drive manufacturers frequently remove discs or "depopulate" an existing drive design to create different capacity points for one set of drive mechanics. This allows the manufacturer to design a single set of mechanics and provide customers with a range of different capacities. However, reducing the disc count will obviously change the airflow characteristics and dynamics of the system and almost invariably results in the need for multiple latch designs. Thus, difficulties can arise in use of a common air latch with a product scheduled for depopulation: multiple latch designs may be required which is, of course, economically undesirable.

Although not as common, some latches are designed to take advantage of magnetic forces that are inherent in the magnetic circuit or supplied by a separate magnet. For example, magnetic bi-stable latches are typically found in high-end server drives where shock requirements are not so stringent. The bi-stable latch is so-called because it has two stable equilibrium points. In a typical bi-stable latch, a plastic member rotates about a designated pivot pin. A magnet is typically molded into the plastic member and is attracted to two separate steel pins, with the size and positioning of the magnet being largely determinative of the amount of force produced thereby. The proximity of the magnet determines to which pin the magnet is attracted. A properly designed bi-stable latch is not allowed to rest in between the two pins. The engagement contact dynamics between the latch and actuator arm are analogous to that of two spur gears.

Magnetic latches are not without their problems. First, magnetic, bi-stable latches are not as common as some other types of latches because of an inherent low shock resistance capability. Additionally, a magnetic latch is actuated by the disc drive actuator itself so that the latch holding torque requirement is at odds with the arm opening torque requirement, e.g., the disc drive actuator must overcome the latch holding force when the drive is powered on. Further, most bi-stable latches are positioned behind the actuator, which tends to limit the coil length and, of course, a longer coil generally results in a higher torque capability of the actuator. Also, because since the latching process inevitably involves some impact, the potential exists for particulate generation which can be fatal to a disc drive. Finally, in order to resist most shocks, the bias is required to be active for most (or all) of the actuator stroke angle. Typically, the bias torque is nonlinear and significant compared to the available actuator torque, which can have detrimental effects on seek performance and track follow power. The presence of a non-linear magnetic bias while the drive is seeking greatly complicates the theory and practice of moving the disc drive arm. Heretofore, the presence of such bias has resulted in a drive that is much slower to reach a designated track and begin reading than would otherwise be preferred. Prior art approaches to solving this problem have attempted to minimize or eliminate the magnetic force during the time that a seek is underway, but that approach is not without its own problems. Further, the most straightforward approach to improving move-time (i.e., decreasing it) in the presence of a magnetic bias would be to increase the available power. However, customer price and other constraints, and industry standards tend to limit the amount of overall power a given disc drive can consume and the move power factors into that limitation.

The economic advantages of using a pure magnetic bias for shock resistance argue that, in spite of the above-identified and other problems, the use of such latches use should be investigated. Although any number of prior art references have considered this approach, there remains no satisfactory solution to the problems associated with the use of magnetic latches and, in more particular, to the problems associated with moving a disc drive arm in the presence of nonlinear magnetic bias. Accordingly, it should now be recognized, as was recognized by the present inventors, that there exists, and has existed for some time, a very real need for a method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred aspect of the instant invention, there is provided a system and method of moving a disc drive arm in the presence of nonlinear magnetic bias. Further, in another preferred embodiment the instant method will be adaptive and/or self-corrective when used with disc drive hardware other than the hardware that was used to model the movement function.

In a first preferred embodiment of the instant invention, a method of controlling a disk drive arm motor such as voice coil motor actuator (VCMA) in the presence of a non-linear magnetic bias is taught. The instant method begins by modeling in a general way the force exerted on a drive arm in the presence of a non-linear magnetic bias. In the preferred arrangement, the model will be designed to represent an arm to which a steel object (e.g., a pin) has been affixed or inserted. Preferably, the torque profile in the presence of the magnetic bias will be estimated and represented functionally using a fifth degree polynomial. Using the calculated arm inertia and sweep angle, a bias feature is then designed to stop the arm after it has traveled a predetermined angular displacement following the impact of a shock. Additionally, a method of moving the arm in the presence of the magnetic field is also disclosed.

As a second preferred embodiment, there is provided an invention substantially as described above, but wherein the movement parameters of the drive arm are adaptively modified based on feedback from the drive controller and arm. In more particular, a method is taught hereinafter of iteratively modifying a given parameter set to more accurately represent the actual performance characteristics of the drive on which it operates. This approach would be particularly useful in the instance where, for example, physical parameters that were determined for one drive are used on another drive. Based on this approach, method of obtaining a stable, adaptive seek controller is taught hereinafter.

The foregoing has outlined in broad terms the more important features of the invention disclosed herein so that the detailed description that follows may be more clearly understood, and so that the contribution of the instant inventors to the art may be better appreciated. The instant invention is not to be limited, in its application, to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

Figure 1:
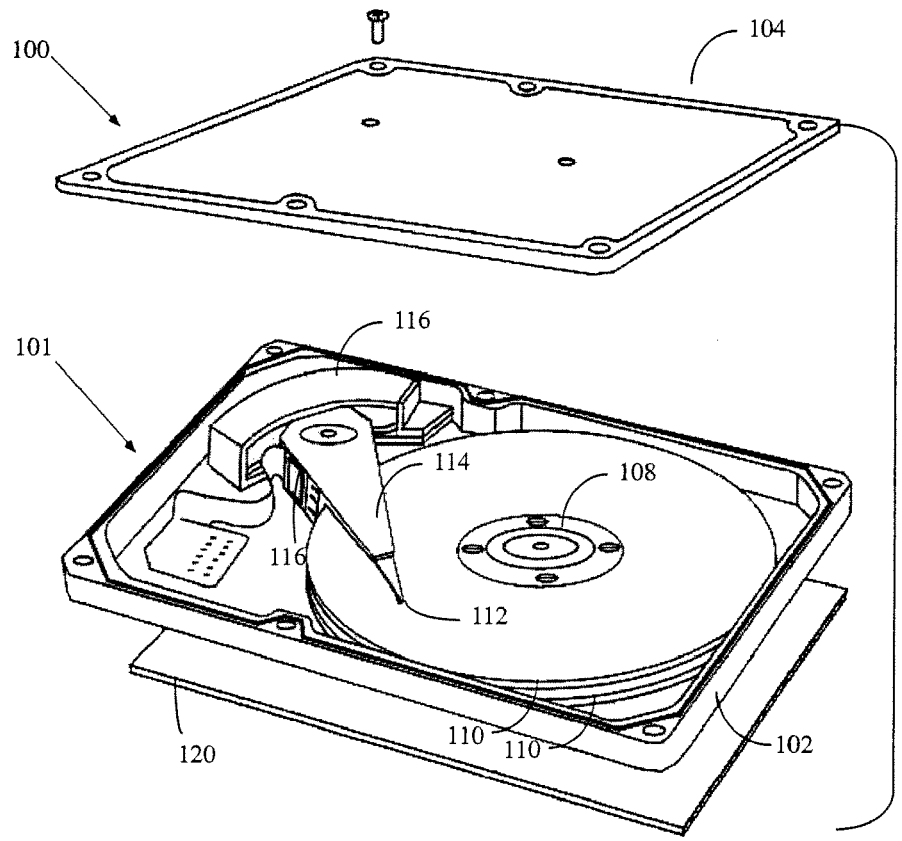
FIG. 1 illustrates the general environment of the instant invention in the context of a computer disc drive.

While this invention is susceptible of being embodied in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

General Environment of the Invention

To illustrate an exemplary environment in which presently preferred embodiments of the present invention can be advantageously practiced in the context of computer disc drives, FIG. 1 shows an exploded view of a data storage device 100. The device 100 is preferably characterized as a small form factor disc drive used to store and retrieve user data in a battery-operated, handheld mobile product such as a notebook computer or a digital camera, but such is not limiting to the scope of the claimed subject matter.

The device 100 includes a rigid environmentally controlled housing 101 formed from a base deck 102 and a top cover 104. A spindle motor 108 is mounted within the housing 101 to rotate a number of data storage media 110 (in this case, two) at a relatively high speed.

Data are stored on the media 110 in an array of concentric tracks (not shown), having a nominal radial density of about 100K tracks/inch (in). The tracks are accessed by a corresponding array of data transducing heads 112 (transducers). The heads 112 are supported by an actuator 114 and moved across the media surfaces by application of current to a voice coil motor, VCM 116. A flex circuit assembly 118 facilitates communication between the actuator 114 and control circuitry on an externally mounted printed circuit board, PCB 120.

Figure 2:
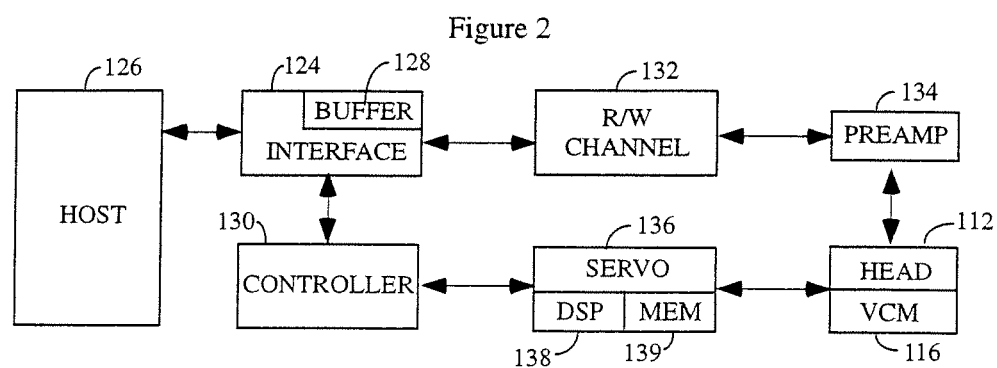
FIG. 2 is a functional diagram of a typical disc drive.

As shown in FIG. 2, the control circuitry preferably includes an interface circuit 124 which communicates with a host device 126 using a suitable interface protocol (fibre channel, SAS, SCSI, etc.). The interface circuit 124 includes a buffer (cache memory) 128 for the temporary storage of data being transferred to or from the media 110. A controller 130 provides top level control for the device 100 and is preferably characterized as a programmable, general purpose processor with suitable programming to direct the operation of the device 100.

A read/write channel 132 encodes data to be written to the media 110 during a write operation and reconstructs transduced readback signals from the media 110 to reconstruct previously stored data during a read operation. A preamplifier/driver circuit (preamp) 134 provides head selection circuitry and conditions signals provided to and received from the heads 112.

A servo circuit 136 provides closed loop positional control for the heads 112. The servo circuit 136 preferably includes a digital signal processor (DSP) 138 which operates in accordance with associated programming and data in memory (MEM) 139 and in response to control inputs from the top level controller 130. A two processor system is preferred, but not required.

During a seek operation, the servo circuit 136 moves a selected head 112 from an initial track to a destination track on the associated media surface. Generally, the seek operation is not concluded until the head has successfully settled onto the destination track and the servo circuit is able to follow that track to allow the initiation of data access operations therewith.

It is desirable to carry out seeks in a minimum amount of time in order to maximize overall data throughput rates with the host 126.

Discussion of the Preferred Embodiments

Turning now to a discussion of the instant invention, according to a first preferred embodiment, there is provided a method of moving a disc drive arm in the presence of a nonlinear magnetic field, wherein the arm has been fitted with a steel or other ferrous element that reacts to the magnetic field and serves to help restrain the motion of the arm in the event of a shock disturbance. In the preferred embodiment, application of the instant approach will yield a latch which utilizes a magnetic bias that has been created by positioning the steel element in the magnetic air gap of a voice coil motor actuator (i.e., VCMA). This sort of latching mechanism has the advantage of being a single, inexpensive mechanical part. Unlike the bi-stable latch constraints discussed previously, the size of the VCMA is less restricted so motor performance can be optimized. In addition, the bias can be distributed over the entire sweep angle, therefore less current is required during head loading than a bi-stable design.

Figure 3:
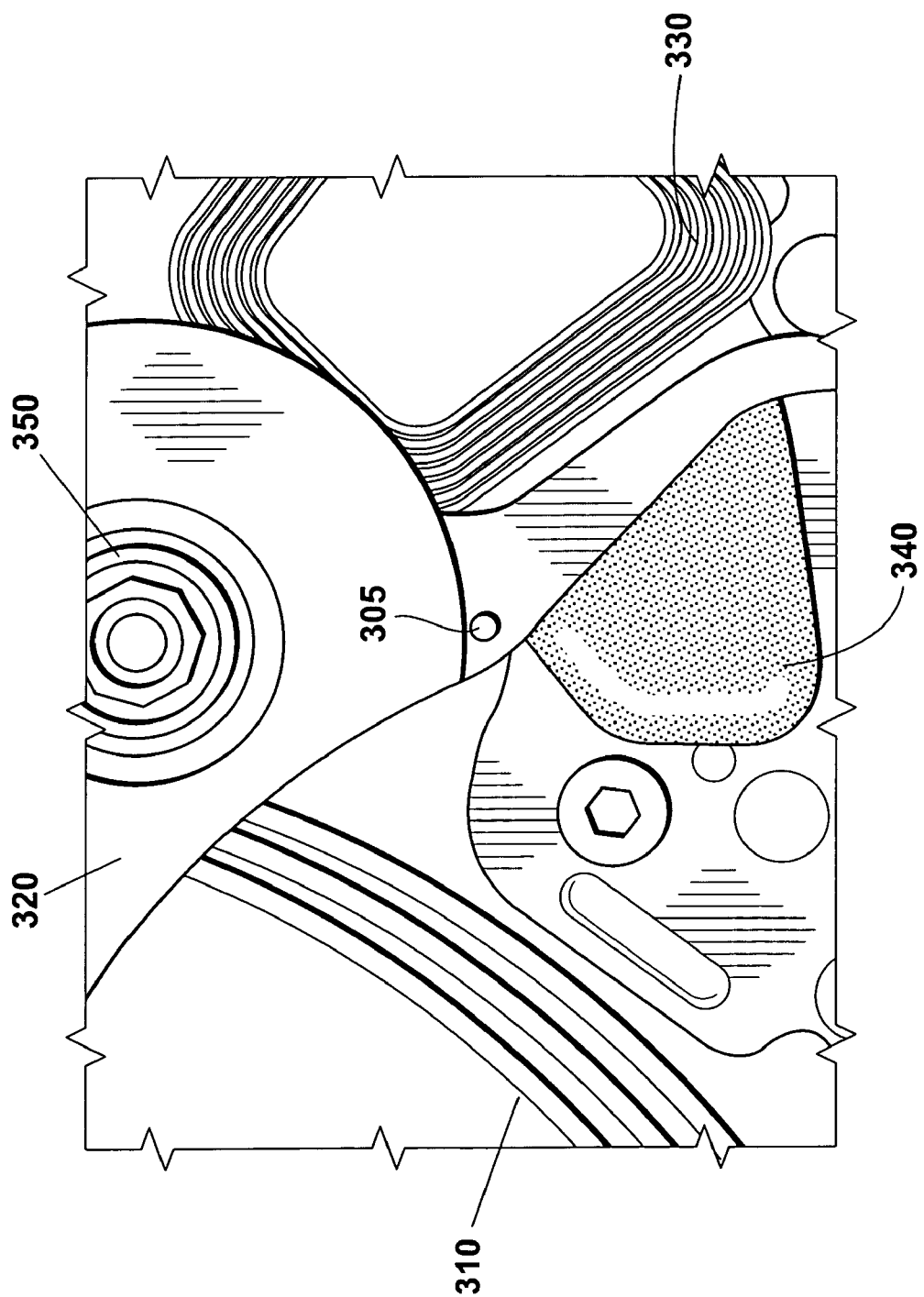
FIG. 3 illustrates a preferred hardware configuration suitable for use with the instant invention.

FIG. 3 illustrates one preferred hardware arrangement suitable for use with the instant invention. As is generally indicated in this figure, disk platters 310 are interrogated by disc drive heads (not shown) via movement of head arm 320 which rotates around shaft bearing 350. In the preferred embodiment, the actuator of the disc will be a VCMA as evidenced by voice coil 330 and magnet 340. Additionally, a bias element 305 (e.g., a steel pin or other ferrous metal item) will preferably be made a part of the arm 320, which bias element 305 is sized and positioned to provide the requisite magnetic latching force according to methods well known to those of ordinary skill in the art. Preferably, the bias element 305 at least partially protrudes into the air gap of the magnetic circuit.

Although, a constant bias torque would be most desirable for controller design, a passive bias is more practical and is utilized for purposes of the instant invention. Preferably, the bias will generate a torque profile capable of matching the energy transferred from a shock and, unfortunately, this tends to produce a nonlinear torque profile. A force is generated on the steel member 305 proportional to the square of the average flux density at the corresponding location. Shaping the torque profile produced by the steel feature can be achieved iteratively by changing the location and geometric parameters of the steel.

Those of ordinary skill in the art will recognize that the hardware configuration of FIG. 3 was only given for purposes of example and other configurations are certainly possible. What is required for purposes of the instant embodiment, though, is that a steel or other ferrous element 305 be in mechanical communication with the drive arm and that the net effect of the nonlinear magnetic field on the element 305 being to oppose or damp the movement of the arm in the presence of shock.

Additionally, it should be noted that, at its most basic, a ferrous element 305 in a magnetic field of the sort utilized herein creates a nonlinear restorative bias of the sort that could be produced by a variety of other methodologies including, without limitation, a metal spring (or other device) that operates elastically and urges the drive arm back toward a nonoperational position (e.g., moves the arm toward its parked position). Thus, when the term "magnetic field" is used herein, that term should be broadly understood to be any elastic restorative force that satisfies this simple requirement.

Given the chosen hardware configuration, it is preferred that a mathematical model be developed that represents that physics of drive arm movement in the presence of the selected magnet field. It is further preferred that the bias be designed to operate across the entire sweep angle to halt the arm's movement within a predetermined angular range assuming a rotational shock of a given magnitude. One preferred strategy for doing this is to design a bias torque that applies an amount of energy that is equivalent to—or greater than—that of the expected shock, thus halting the rotational progress due to the shock within a predetermined or desired angular displacement. As might be expected, this model should take into account various disc drive geometrical and other form factor limitations as discussed below.

In formulating the mathematical model, it is expected that in most cases industry and other standards will be taken into account. For example, mounted below the VCMA is typically a printed circuit board (PCB) that contains most of the disc drive electronics. In order to reduce the effects of electromagnetic interference and prevent small ferrous particles from adhering to the PCB, a maximum VCMA flux leakage specification is typically required at the PCB surface. Additionally, and as was previously discussed, both operating and nonoperating shock disturbances can be detrimental to disc drive performance. For a given rotary arm design, an imbalance typically exists about the pivot center. Effects of linear shock and vibration are magnified by the size and distance the imbalance lies away from the pivot. Therefore, and according to a preferred embodiment, robustness to operational shock and vibration are achieved by minimizing the arm imbalance. For example, the coil mass and geometry can be selected to reduce the overall arm imbalance. In the case of rotational shock, a maximum limit is preferably specified that the latching mechanism is guaranteed to meet and such will preferably be reflected in the mathematical model.

Further, industry standards operate to limit the size or form-factor of a disc drive and therefore the size of the VCMA. This limitation tends to restrict the height and profile of the magnetic circuit. The VCMA is typically mounted in one corner of the drive shell and allowed to extend out to the arm pivot location. In most instances, the PCB, base mounting shell, cover, and magnetic circuit thickness must all sum to less than the form-factor height. Still further, the voice coil profile is typically limited by the sweep angle or total stroke of the actuator. Note that the above general criteria been assumed to illustrate a preferred embodiment of the instant invention and, as such, are not critical its operation. Those of ordinary skill in the art will understand how the preferred embodiments discussed hereinafter would need to be modified in the event that any of the foregoing criteria are changed.

Using the above geometric form factor constraints and sweep angle requirements, a coil geometry is next preferably determined. Although a lumped parameter magnetic circuit design was generated might be utilized, the use of lumped parameter methods typically overestimates the air gap flux density and gives little information about the flux leakage behavior. Thus, the geometry will preferably further be refined into a distributed parameter representation according to methods well known to those of ordinary skill in the art. Preferably, magnetic finite-element analysis will be used to provide a more realistic representation of the actual VCMA performance. The results of one such study for a particular disk drive are summarized in Table 1 below.

TABLE 1

Dynamic Model Parameter Comparison

| Parameter | Lumped | Distributed |
|---|---|---|
| Torque factor ($K_t$) | 87 N-mm/amp | 75 N-mm/amp |
| Inertia (J) | 47.31 g-cm$^2$ | 47.31 g-cm$^2$ |
| Coil resistance (R) | 8.7 Ω | 8.7 Ω |
| Coil inductance (L) | 2.6 mH | 1.15 mH |

As next preferred step, a functional form that models a shock to the drive will be selected. Although many different model equations might be chosen, for purposes of computational convenience preferably an equation similar to the following will be used:

$$\alpha_s(t) = A_p \sin\left(\frac{\pi t}{\tau}\right),$$

where $A_p$ is the shock angular acceleration amplitude and $\tau$ is the shock pulse width. Those of ordinary skill in the art will recognize that integrating the previous equation with respect to time and choosing the boundary conditions $\alpha_s(0)=\omega_s(0)=0$, produces the angular velocity:

$$\omega_s(t) = \frac{A_p \tau}{\pi}\left[1 - \cos\left(\frac{\pi t}{\tau}\right)\right].$$

The torque on the arm resulting form the assumed shock can be written as:

$$T_s(t) = J\alpha_s(t) = JA_p \sin\left(\frac{\pi t}{\tau}\right)$$

and the total energy, $E_s$, of the shock can be written as the time integral of the shock power, $P_s = T_s \omega_s$, over the pulse width:

$$E_s(t) = \int_0^\tau T_s(t)\omega_s(t)dt = \frac{2J(A_p\tau)^2}{\pi^2}.$$

Finally, given the foregoing, the energy of a bias torque, $E_b$, can be computed from:

$$E_b = \int_o^\theta \phi(\theta)d\theta$$

where $\phi(\theta)$ is the bias torque as a function of the arm sweep angle $\theta$.

It is important to note that in the preferred embodiment, a bias torque will be selected that applies an amount of energy that is greater than or equal to that of the shock (i.e., $E_b \geq E_s$) and in an opposite direction, thereby tending bringing the arm to back rest after it has traversed a desired angular displacement. For purposes of illustration only, and by reference to the previous equations and Table 1 supra, a particular example of the shock energy was determined to be 6.13 mJ. Thus, if a constant bias were to be chosen to bring the arm to rest within the total sweep angle, $\theta_T$, the magnitude of the bias torque required would be $\phi = E_s/\theta_T$.

It is further noted that there are frictional forces between the head and disc interface which tend to suppress motion during a shock. These forces were neglected for purposes of this disclosure, although such could readily be incorporated into the instant design by those of ordinary skill in the art. Thus, in some sense the present approach represents a worst case scenario in terms of the required torque.

Figure 5:
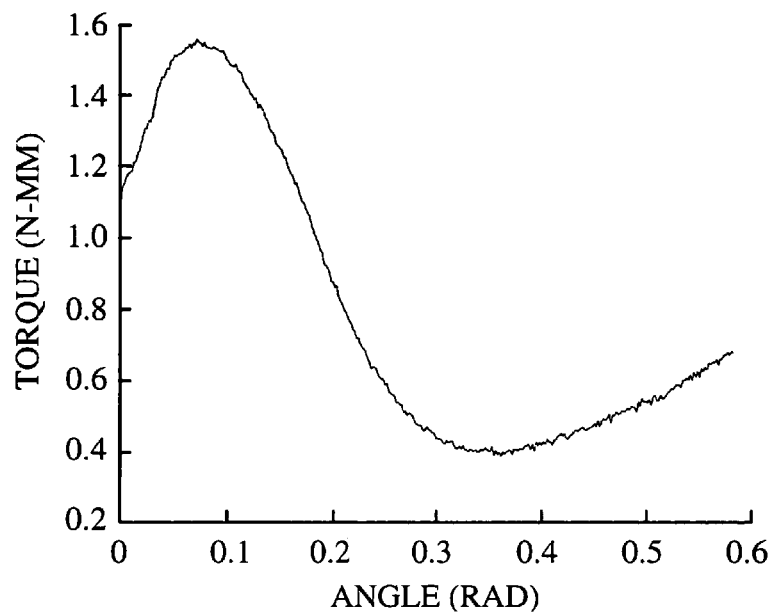
FIG. 5 contains a plot of an empirically determined magnetic bias torque.

As next preferred step, the energy of the torque profile throughout the sweep angle is calculated. In some preferred embodiments, the torque profile will be determined empirically via direct measurements taken on a drive equipped with a magnetic latch of the general sort disclosed herein (e.g., see FIG. 5). In other instances, this curve might be estimated using, for example, finite element modeling of the drive arm in a magnetic field (Maxwell's equations) based on input parameters such as known (or assumed) boundary conditions, hardware geometry, magnetic field information (including size, dimensions, strength, etc. of the magnet), air gap, etc., that are representative of the selected drive, The torque profile will preferably be fit to an n-th order polynomial of the form:

$$\phi(\theta) = \sum_{i=0}^n c_i \theta^i$$

where $c_i$ is the i-th order coefficient. Those of ordinary skill in the art will recognize that the functional form selected above to model the drive torque profile is given only as an example of the sorts of functions that could potentially be used. For example, rather than a polynomial, a sum (or product, etc.) of exponentials, trigonometric functions (e.g., sines, cosines, etc.), generalized wavelets, or other basis functions could be used. All that is required is that the functional form of $\phi(\theta)$ be specified and that, that the functional form contain one or more parameters that are to be estimated from the empirical or theoretical (e.g., finite element) torque profile, and that the resulting function should be nonlinear in the variable $\theta$. In the preferred embodiment, the torque profile will be estimated using a fifth degree polynomial although, and as is discussed more fully hereinafter, other lower (or higher) degree polynomials could certainly be used in the alternative. Additionally, it is preferred that the polynomial coefficients be determined using a curve fitting routine such as least squares according to methods well known to those of ordinary skill in the art.

Note that it is an important aspect of the instant invention that most of the relevant physical parameters of the motor and arm (and other hardware components of the drive) will be assumed to be at least approximately known or estimable, and that the only remaining significant unknowns are associated with the magnetic bias torque. More specifically, the values of the parameters in the selected functional form (e.g., the coefficients of a fifth degree polynomial) that is used to approximate the bias torque will be assumed to be unknown, at least until a fitted or initial value for those parameters is chosen.

As a next preferred step, a dynamic model will be developed based on the torque profile and the physics of the drive itself. Noting that the magnetic bias opposes the arm torque when a positive current is applied, the mechanical dynamics of the VCMA can be represented as:

$$J\ddot{\theta}=K_t i - \phi(\theta)$$

where $\ddot{\theta}$ is the angular acceleration (the double dots above theta representing a second derivative), J is the arm inertia, and $K_t$ is the torque factor as defined previously. The electrical circuit dynamics of the VCMA are preferably described by $$V_s = Ri + L\frac{di}{dt} + V_b,$$

where $$V_b = K_t \dot{\theta}$$

is the back electromotive force, R and L, are the coil resistance and coil inductance, respectively. The supply voltage, $V_s$, represents the control signal. In a three-state system (e.g., position, velocity, and current), choosing the states as $x_1=\theta$, $x_2=\dot{\theta}$, and $x_3=i$, and denoting the control input as $u=V_s$, the system can be represented in the state-space form as according to the following key result:

$$\dot{x} = Ax + Bu - B_\phi \phi(X_1)$$

where, $$A = \begin{bmatrix} 0 & 1 & 0 \\ 0 & 0 & \frac{K_t}{J} \\ 0 & -\frac{K_t}{L} & -\frac{R}{L} \end{bmatrix}, B = \begin{bmatrix} 0 \\ 0 \\ \frac{1}{L} \end{bmatrix}, B_\phi = \begin{bmatrix} 0 \\ \frac{1}{J} \\ 0 \end{bmatrix}$$

It should be noted that the matrix $B_\phi$ of the bias nonlinearity is not in the range space of the input matrix B. Therefore, the system does not satisfy the matching condition, as that term is known in the nonlinear systems arts.

Note that the forgoing approach has resulted in the determination of a preferred dynamic model for use in moving a drive arm in the presence of a given non-linear magnetic bias. Those of ordinary skill in the art will understand that the previous approach may readily be modified to accommodate different models of the VCMA dynamics and magnetic bias. As such, it is expected that the previous equation may need to be modified in some circumstances and the derivation presented above instructs as to how this might be done generally.

As a next preferred step, a reference trajectory will be generated for the preferred hardware configuration. Note that this step is actually optional, although the instant inventors (and others) have determined that the use of a reference trajectory has the potential to greatly improve the performance (e.g., reduce the seek time) of drives in which such is used. The trajectory is preferably modeled by a functional form such as high order polynomial although certainly other functional forms could certainly be chosen in the alternative. That being said, whatever the reference model that is chosen, preferably the model will produce smooth trajectories for the controller to track so that vibration, acoustic energy, and power usage will be minimized. In the preferred arrangement, a seventh-order polynomial is utilized:

$$\theta_r(t) = \sum_i^7 \beta_i t^i$$

where coefficients $\beta_i$ are to be determined according to the following preferred boundary conditions:

$$\theta(0)=\dot{\theta}(0)=\ddot{\theta}(0)=\dddot{\theta}(0)=0$$

$$\dot{\theta}(t_f)=\ddot{\theta}(t_f)=\dddot{\theta}(t_f)=0$$

$$\theta(t_f)=\theta_f$$

Trajectories can then be defined for $\theta_r$, $\dot{\theta}_r$, and $\ddot{\theta}_r$. The reference trajectory for current is preferably computed from the following equation:

$$i_r(t) = \frac{J}{K_t}\ddot{\theta}_r(t)$$

and the reference voltage from:

$$V_r(t) = \frac{LJ}{K_t}\dddot{\theta}_r(t) + Ri_r(t) + K_t\dot{\theta}_r(t).$$

Introducing the previous equation into the corresponding reference model $$\dot{x}_r = Ax_r + BV_r$$

produces the required state reference trajectory.

Finally, and according to still another preferred embodiment, there is provided a method substantially similar to that discussed previously, wherein an adaptive method of compensating for the magnetic bias uncertainty is utilized. That is, those or ordinary skill in the art will recognize the method of determining a reference trajectory discussed previously is theoretically valid only for a disc drive for which the parameters such as those in Table 1 have been determined. Although it might be expected that other disc drives of the same type will have similar parameter values, there is no assurance of that fact and, in some circumstances, small changes in the drive parameters could possibly lead to substantial variations in calculated coefficient(s). As a consequence, there is taught hereinafter a method of creating a self-correcting controller for use in the presence of non-linear magnetic bias.

As a starting point, it should be noted that one goal of the instant embodiment is to design an adaptive controller that will estimate the uncertain coefficients of the nonlinear bias in the dynamic model and take corrective action such that the tracking error will continuously improve and eventually converge to a stable solution that is appropriate for the particular drive on which the method is implemented. To simplify the derivation that follows, let the state error e(t) be defined as $e(t)=x(t)-x_r(t)$, and let:

$$\mu_0 = \frac{K_t}{J}, \mu_1 = \frac{1}{J}, \mu_2 = \frac{K_t}{L}, \mu_3 = \frac{R}{L}.$$

Additionally, the nonlinear bias term $\phi(x_1)$ can be defined in vector form as:

$$\phi(x_1)=w^T c,$$

where, $$w^T=[x_1{}^n, x_1{}^{n-1}, x_1{}^{n-2}, \ldots, 1]$$

$$c^T=[c_n, c_{n-1}, c_{n-2}, c_0]$$

The control law is preferably chosen as a combination of feed-forward and feedback components:

$$u=L(\dot{x}_{3r}+\mu_2 x_{2r}+\mu_3 x_{3r}+u_f)$$

to produce the error dynamics:

$$\dot{e}_1=e_2,$$

$$\dot{e}_2=\mu_0 e_3-\mu_1 w^T c,$$

$$\dot{e}_3=-\mu_2 e_2-\mu_3 e_3+u_f.$$

Note that the feedback component, $u_f$, is an auxiliary control signal and will be determined separately in the text that follows. Taking advantage of the fact that $$\dot{e}_1=e_2$$

and to simplify the Lyapunov analysis relative to the unmatched uncertainty, the following change of variables is introduced:

$$s_1=e_2+\lambda e_1$$

$$s_2=\mu_0 e_3+\mu_1 w^T \hat{c}+\alpha_1 e_1+\alpha_2 e_2$$

where $\hat{c}$ is the estimate of the parameter vector c, $\alpha_1$ and $\alpha_2$ are positive gains. The dynamics of $s_1$ and $s_2$ can be determined to be:

$$\dot{s}_1=\dot{e}_2+\lambda\dot{e}_1-s_2+s_2$$

$$\dot{s}_2=\mu_0\dot{e}_3+\mu_1\dot{w}^T\hat{c}+\alpha_1\dot{e}_1+\alpha_2\dot{e}_2.$$

Substituting into the previously equations and simplifying, then yields:

$$\dot{s}_1=-\alpha_1 e_1-(\alpha_2-\lambda)e_2+\mu_1 w^T \tilde{c}+s_2$$

$$\dot{s}_2=-\mu_0(\mu_2 e_2+\mu_3 e_3-\alpha_2 e_3-u_f)+\alpha_1 e_2+\mu_1(x_2 v^T \hat{c}+w^T \dot{\hat{c}}-\alpha_2 w^T c)$$

where $$\tilde{c}=\hat{c}-c,$$

and, $$v^T=[nx_1{}^{n-1},(n-1)x_1{}^{n-2},\ldots,0].$$

It is important to note that the previous equation for $\tilde{c}$ provides a method for updating the polynomial coefficients after each seek to correct the current polynomial coefficients. Now, the auxiliary control signal, $u_f$, is preferably chosen to be the following:

$$u_f = \mu_2 e_2 + \mu_3 e_3 - \alpha_2 e_3 -$$
$$(\alpha_1 e_3 + \alpha_3 s_2 + s_1)/\mu_0 + (\alpha_2\mu_1 w^T \hat{c} - \mu_1 x_2 v^T \hat{c} - \mu_1 w^T \dot{\hat{c}})/\mu_0.$$

As a result, the dynamics of $s_2$ becomes:

$$\dot{s}_2=-\alpha_3 s_3-s_1+\mu_1\alpha_2 w^T \tilde{c}.$$

A Lyapunov function candidate is chosen as:

$$\dot{V}(s,\tilde{c}) = \frac{1}{2}(s_1^2 + s_2^2 + \tilde{c}^T \Gamma \tilde{c})$$
$$= -(\alpha_2-\lambda)s_1^2 - \alpha_3 s_2^2 + (-\alpha_1 + \alpha_2\lambda - \lambda^2)e_1 s_1 +$$
$$\mu_1 s_1 w^T \tilde{c} + \alpha_2\mu_1 s_2 w^T \tilde{c} + \dot{\tilde{c}}^T \Gamma \tilde{c}.$$

Choosing the adaptation law as:

$$\dot{\hat{c}}^T=-\mu_1(s_1+\alpha_2 s_2)w^T \Gamma^{-1}$$

and the coefficients $\alpha_1$, $\alpha_2$, and $\lambda$ such that, $$-\alpha_1+\alpha_2\lambda-\lambda^2=0$$

results in $$\dot{V}=-(\alpha_2-\lambda)s_1{}^2-\alpha_3 s_2{}^2.$$

Therefore, V is a Lyapunov function if $\alpha_2>\lambda$. Hence, $s_1\to 0$, and $s_2\to 0$ per Barbalat's lemma. Similarly, since $s_1=e_2+\lambda e_1$, $e_1\to 0$, $e_2\to 0$. However, $$\mu_0 e_3\to-\mu_1 w^T \hat{c}.$$

That is, the current is used to compensate for the estimated nonlinear bias. Thus, under fairly general conditions, all of the signals $e_1$, $e_2$, $e_3$, and $\hat{c}$ are bounded, and $e_1$ and $e_2$ asymptotically converge to zero as would be hoped with an iterative/adaptive method.

By way of summary, for the VCMA dynamics chosen previously and in the presence of nonlinear magnetic bias of the form assumed above, if a control law and adaptation law (respectively) are chosen to be of the following form:

$$u = L[\dot{x}_{3r} + \mu_2 x_2 + \mu_3 x_3 + (\gamma_{11} + \gamma_{12}w^T\Gamma^{-1}w)e_1 +$$
$$(\gamma_{21} + \gamma_{22}w^T\Gamma^{-1}w)e_2 + (\gamma_{31} + \gamma_{33}w^T\Gamma^{-1}w)e_3 +$$
$$\gamma_{c1}x_2 v^T \hat{c} + \gamma_{c2}w^T \hat{c} + \gamma_{c3}w^T\Gamma^{-1}ww^T\hat{c}],$$

$$\dot{\hat{c}} = -\mu_1^2\alpha\Gamma^{-1}ww^T\hat{c} + (\sigma_1 e_1 + \sigma_2 e_2 + \sigma_3 e_3)\Gamma^{-1}w$$

where, $$\gamma_{11} = -\frac{(\lambda + \alpha_1\alpha_3)}{\mu_0}, \quad \gamma_{12} = -\frac{\mu_1\sigma_1}{\mu_0},$$

$$\gamma_{21} = \frac{(\mu_2\mu_0 - \alpha_1 - \alpha_2\alpha_3 - 1)}{\mu_0}, \quad \gamma_{22} = -\frac{\mu_1\sigma_2}{\mu_0},$$

$$\gamma_{31} = \mu_3 - \alpha_2 - \alpha_3, \quad \gamma_{32} = -\frac{\mu_1\sigma_3}{\mu_0},$$

$$\gamma_{c1} = -\frac{\mu_1}{\mu_0}, \quad \gamma_{c2} = -\frac{\mu_1(\alpha_2 - \alpha_3)}{\mu_0}, \quad \gamma_{32} = -\frac{\mu_1^3\alpha_2}{\mu_0},$$

and, $$\sigma_1 = -\mu_1(\lambda + \alpha_1\alpha_2), \quad \sigma_2 = -\mu_1(1 + \alpha_2^2), \quad \sigma_3 = -\mu_1\alpha_2\mu_0,$$

and, if the gains $\alpha_1$, $\alpha_2$, and $\lambda$ are chosen such that $\alpha_2>\lambda$, and $$-\alpha_1+\alpha_2\lambda-\lambda^2=0,$$

then $e_1$, $e_2$, $e_3$, and $\tilde{c}$ are bounded, and $e_1$ and $e_2$ asymptotically converge to zero.

Note that if all of the terms in the previous equation for u that contain $\Gamma^{-1}$ are eliminated from that equation, the terms that remain would be suitable for use as a non-adaptive control law. Note that in the equation developed above for u, the last line of that equation that the terms in the first two lines represent the control law for movement in the presence of a nonlinear magnetic field, i.e., in simplest terms u is the voltage that is sent to the motor (e.g., a VCM) to control it (u actually has units of "volts").

Further, the terms in the last (third) line in the definition of u (i.e., terms containing the variables $\gamma_{c1}$, $\gamma_{c2}$, $\gamma_{c3}$, and $\tilde{c}$) represent the contribution of the adaptive component to the control law. As a consequence, it should be clear that the previous equation is still valid without the adaptive component, although in such a case the controller will be limited to the use of the torque profile parameter estimates that were provided as initial estimates. Said another way, the first two lines of u can be used by themselves as a control law to move a disk drive arm in the presence of a nonlinear magnetic field. However, by augmenting u with the terms contained in the last line (and in view of the definition of $\tilde{c}$), an iterative/adaptive scheme is created that will improve on the torque profile parameter estimates as the drive operates.

Additionally note that the first three summands in u represent the contribution of the reference voltage equation, $V_r(t)$.

Figure 4:
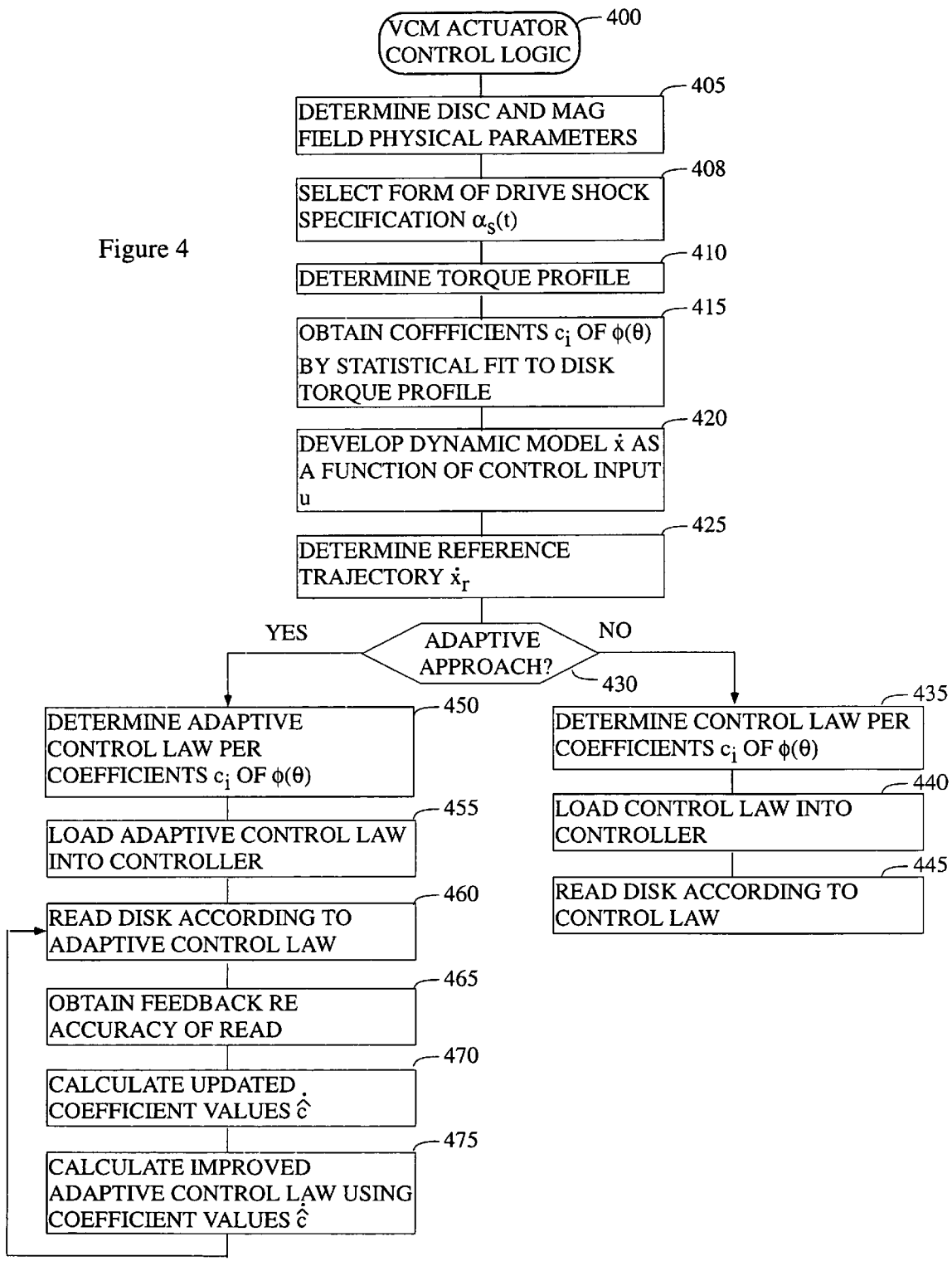
FIG. 4 is a flow chart that illustrates some preferred steps in the instant invention.

FIG. 4 contains a summary of preferred series of implementation steps 400 that would be suitable for use with the instant invention. As a preferred first step 405, various physical parameters related to the drive and magnetic filed will be selected or determined, depending, for example, on whether an existing drive is being modified or whether a new drive is being designed. Note that the preferred drive is one in which the drive arm has been modified by the addition of a ferrous bias element as has been discussed previously.

As a next preferred step 408, a drive shock specification as will be selected. The properties of the selected function will help determine in a general way some of the characteristics of a desired torque profile. Note that, this step is optional and the quantity $E_s$ could readily be estimated by other (e.g., empirical) methods, rather than calculated analytically. Further, although in the preferred embodiment the quantities $E_b$ and $E_s$ will be chosen such that $E_b \geq E_s$, that is similarly not an absolute requirement, but such should be the case if the magnetic bias is to stop the arm's motion within a particular angular range. Finally, in broadest terms the quantity $E_s$ merely operates to help determine the magnitude of the torque bias that is required and direct selection of that (torque bias) quantity—without determination of a shock function—is certainly within the scope of the instant invention.

Next, preferably a torque profile will be determined for the drive arm (step 410) of the selected disc. This curve might be either obtained empirically by direct measurement of a subject drive or via numerical methods such as a finite element solution. Preferably, the torque profile will contain numerous measurements of the magnetically induced torque as a function of arm angle theta.

As a next preferred step 415, a functional form will be chosen and parameters (e.g., coefficients $c_i$) of the chosen function form will be estimated from the trend of the torque profile data values obtained at step 410. Note that, although statistical fitting of the chosen functional form to the torque data values is encouraged, it is not required. At least in the adaptive approach of the instant invention, given some sort of initial values for the coefficients $c_i$ (even constant ones) and a functional form, the instant adaptive method will eventually yield accurate estimates of the actual drive coefficients by the iterative procedure discussed above. This assumes, of course, that the initial values are at least somewhat close to the actual parameter values, where "somewhat close" is used in the sense of close enough so that the adaptive algorithm converges. Those of ordinary skill in the art will understand how to select initial values which satisfy this requirement.

As a next preferred step 420, a dynamic model $\dot{x}$ will preferably be developed as a function of the control input. Additionally and optionally, a reference trajectory $\dot{x}_r$ will be calculated (step 425).

The steps that follow depend on whether an adaptive (the right branch of decision item 430) or a non-adaptive (the left branch of decision item 430) is follows. In the event that a non-adaptive method is elected, the control law will be determined the equation for u offered previously (step 435). This law will be loaded into the drive controller (step 440) and then used to read the hard disc in the presence of the given nonlinear magnetic field (step 445). No modification of the torque bias equation parameters will be performed thereafter in this embodiment.

However, in the event that an adaptive method is to be implemented, the adaptive control law will preferably be determined per the equation for u presented previously. Next, the law so-determined will be loaded into the controller (step 455) where it will then be available for a disc read (step 460). Preferably, after each state measurement, feedback will be obtained in connection with the accuracy of the seek, such information being available in different variations depending on the particular disc drive. As a specific example, during a 10 ms seek operation wherein the sampling period is chosen to be 40 microseconds, the state vector and bias coefficient vector will preferably be updated, a new control law calculated and transmitted to the controller, and the output voltage adjusted every 40 microseconds during that move.

As a next preferred step, updated coefficients values will be obtained based on the feedback information and preferably according to the corresponding equation given above for $\tilde{c}$ (step 470). Note that in some cases it might be desirable to a gradient projection algorithm to increase the chances that the coefficients remain near or with their bounding limits. In more particular, a currently preferred projection constraint is defined as $$g = c^T c - c_u^T c_u$$

where $c_u$ is the coefficient vector of the magnetic bias upper bound. One advantage of this approach is that it may tend to limit the instances where the updated coefficient vector momentarily moves further away from its ultimate solution, only to then work its way back in subsequent iterations. By forcing the solution vector to remain pointed in the right general direction, the length of time necessary to reach a solution may ultimately be increased but this is with the hope that the resulting coefficients will remain usable during the entire convergence process.

Finally, an updated control law u will be calculated based on $\dot{e}$ (step 475) after which additional seek/correction operations will be conducted, preferably the process being repeated until convergence to a stable solution is attained.

Finally, some the numerical results will be presented to further illustrate how the instant invention would be applied in practice. In the example that follows, physical parameters were measured for a single VCMA and were used to generate reference trajectories according to the procedures discussed previously for a 5 degree seek angle. The inertia, torque factor, resistance, and inductance of the test drive were determined to be, respectively, 48.26 g-cm$^2$, 71.5 N-mm/amp, 8.82 Ω, and 1.11 mH. The magnetic bias was also measured and is shown as a function of actuator sweep angle in FIG. 5. The bias was fit to a fifth-order polynomial which yielded six coefficients: $c_5$=0.4518, $c_4$=−0.8749, $c_3$=0.6232, $c_2$=0.1883, $c_1$0.0186, and $c_0$=0.001. Based on tolerance analysis of the geometric dimensions, the magnetic bias could be bounded by a ±7% envelope about the nominal polynomial fit. Current feedback was achieved by measuring the voltage drop across a 0.2 Ω sense resistor. A PI controller was implemented to move and regulate the actuator 2 degrees off of the nominal shipping position. The tracking trajectories were designed for a 5 degree move. Although most disc drive seek controllers operate at or near saturation, the reference trajectories were not designed near saturation for this study in order to protect the experimental hardware during gain tuning.

Note that this example focuses mainly on the adaptive controller results, with the understanding that aggressive trajectories could potentially be generated and tracked. It is also noted that the trajectories could be designed to take advantage of the directional dependence of the bias effects. For example, an inward move—working as it does with the bias—would be capable of producing a faster time than outward move for a given saturation voltage.

For purposes of subsequent comparison, a state-feedback control system was utilized. The control law was chosen according to the equation $$u(t) = -Ke(t) + V_n,$$

where, e(t) is the state error function which is defined as $$e(t) = x(t) - x_r(t).$$

Figure 6:
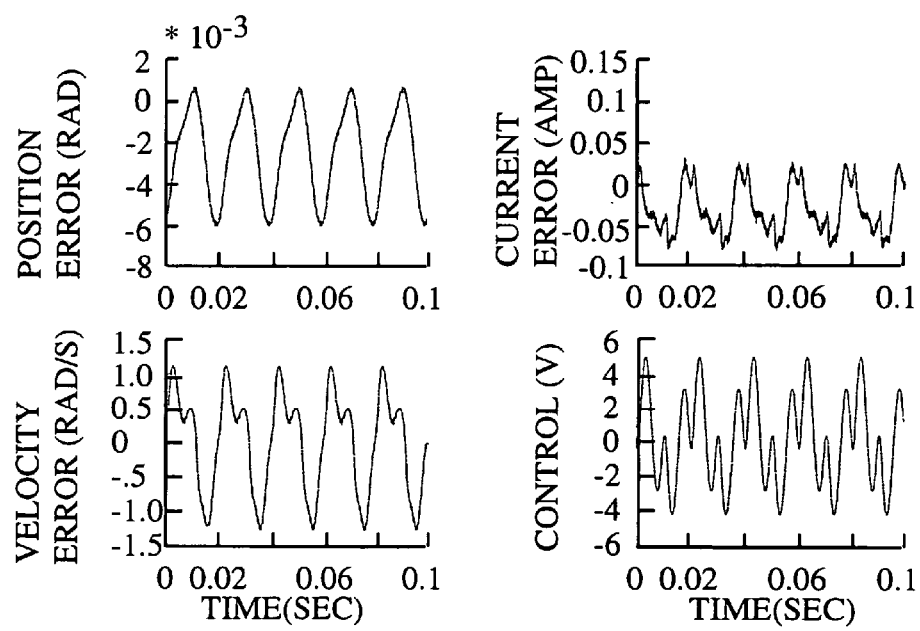
FIG. 6 contains state feedback performance charts representative of one aspect of the instant invention.

Iterative tuning of the state-feedback gain vector resulted in K=[150, 1, 0.5]. The sample rate was chosen at 20 kHz which is over 50 times the speed of the closed loop poles ensuring that the dynamics of the zero-order hold could be neglected. Data was collected for multiple groups of 100 seeks to ensure repeatability. FIG. 6 shows the control and error performance of a representative sample of 10 seeks. Table II gives the error norms and power consumption for the 10 seek sample.

TABLE 2

Controller Performance Summary

| Parameter | State Feedback | Adaptive | Adaptive w/Proj |
|---|---|---|---|
| Position error $L_2$ norm | 0.661 | 0.0161 | 0.0181 |
| Velocity error $L_2$ norm | 14.45 | 11.94 | 12.13 |
| Maximum Voltage (V) | 5.078 | 5.534 | 5.292 |
| Mean power (mW) | 793 | 825 | 819 |

Figure 7:
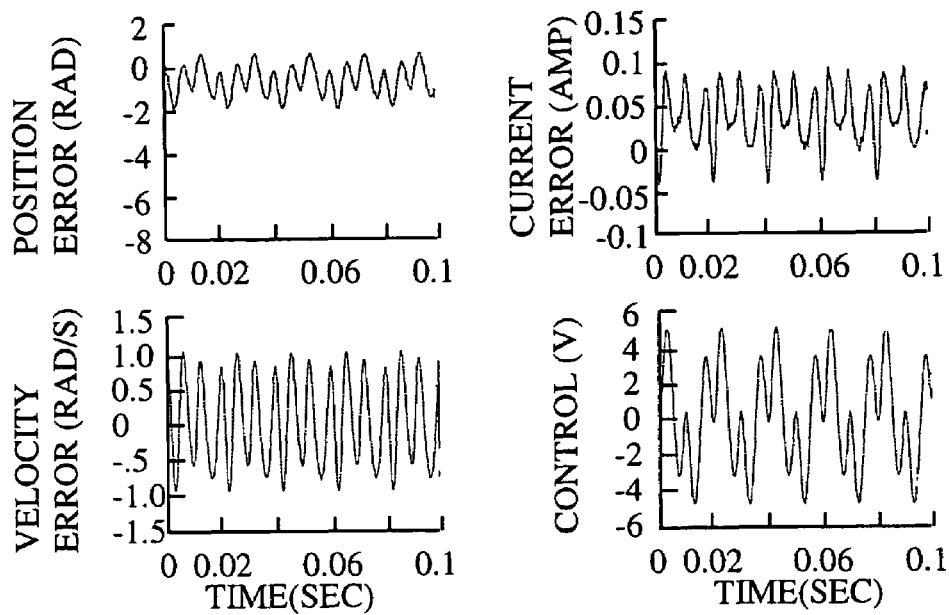
FIG. 7 contains performance charts representative of an adaptive controller design.
Figure 8:
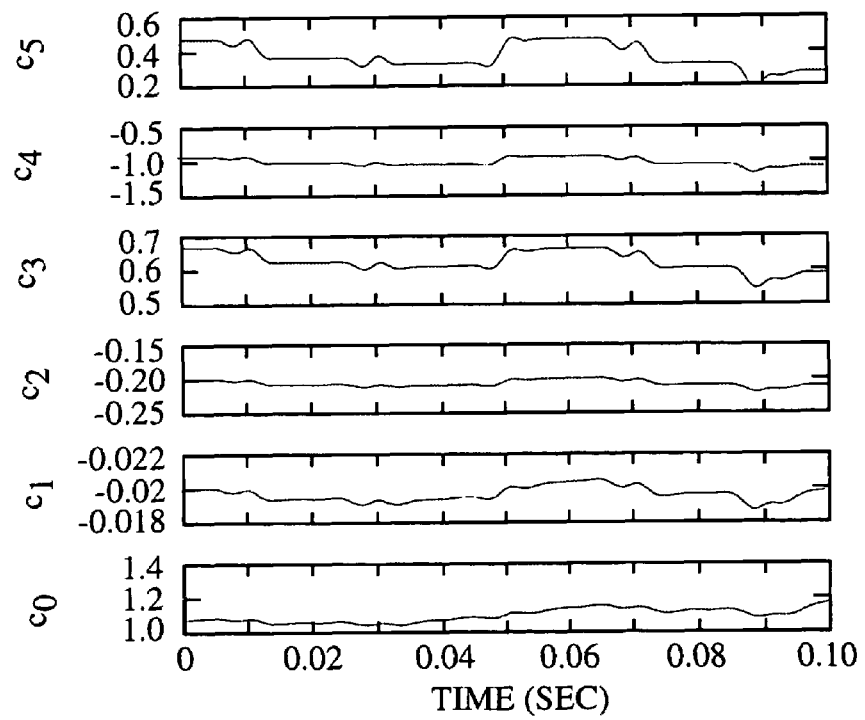
FIG. 8 contains a series of curves that illustrate the changing values of the estimated bias polynomial coefficients during adaptive operation of the controller.

Turning next to a preferred adaptive control scheme, the control function was taken to be control law u offered previously, with the initial conditions of the bias coefficient estimate being set at the lower bound (−7%). As in the state-feedback case discussed supra, the sample rate was set at 20 kHz and tuning showed the best trajectory tracking coefficients to be such that $\lambda = w_n$, $\alpha_2 = 2w_n$, and $\alpha_3 = w_n$ where $w_n = 400\pi$. It can readily be determined via the equations presented previously that $\alpha_1 = (w_n)^2$. The adaptation gain matrix was also determined iteratively as Γ=diag{1.0e-7, 4.0e-9, 1.0e-12, 1.0e-13, 1.0e-14, 1.0e-15} according to methods well known to those of ordinary skill in the art. Tracking error performance for a 10 seek sample is shown in FIG. 7 along with the estimated bias coefficients in FIG. 8. Note that the position tracking error was significantly less than the state feedback case with comparable power consumption. Note also that the coefficients would occasionally drift outside the expected boundary limits during a given test run. Since the bounds on the bias are typically known, it is will usually be advantageous to prevent large variations in the bias estimate by limiting them to lie within the known bounds.

The third column in Table 2 contains the results of an adaptive control scheme augmented by gradient projection. As can been seen, this approach remained superior to the state-feedback case, but still slightly worse than adaptation without projection. This approach did seem to effectively contain the coefficient trajectories, though. Because the coefficient dynamics are constrained, a slight increase in tracking error will typically be realized. However, this effect may be considered an acceptable tradeoff in order to prevent large variations in the coefficient dynamics. Projection seemed to have the most influence on the higher order coefficients and was invoked 1262 times in a 2000 point, 10 seek sample run As a final note, accurate/higher order modeling of the magnetic bias will typically result in increased model complexity. This, of course, indicates that an increase in memory or processor capability will likely be required to perform the calculations necessary to determine the control law, thereby increasing the cost of the subject drive. In some cases, though, a tradeoff might be made between sample rate and modeling accuracy. That is, it is suggested that a sample rate increase could be used to recover some of the performance lost by reducing modeling accuracy. Thus, a solution of the sort taught herein would still be available for disc controllers that are memory or processor limited. Those of ordinary skill in the art will readily understand the tradeoffs involved in selecting these parameters and will be able to determine, empirically if need be, a good combination for a particular disc drive and magnetic bias.

While the invention has been described and illustrated herein by reference to a limited number of embodiments in relation to the drawings attached hereto, various changes and further modifications, apart from those shown or suggested herein, may be made therein by those skilled in the art, without exceeding the scope of what has been invented, the scope of which is to be determined only by reference to the following claims.

What is claimed is:

1. A method of moving a disc drive arm in a nonlinear magnetic field, wherein is provided at least one disk drive arm physical parameter, comprising the steps of:
    (a) determining a torque bias of said disc drive arm within said magnetic field;
    (b) selecting a functional form, said functional form having at least one parameter associated therewith;
    (c) determining a value for each of said at least one parameters of said functional form, said functional form at least approximately representing said torque bias when said determined parameter values are substituted for each of said at least one parameters;
    (d) determining a control law using at least said functional form, said determined parameter values of said parameters, and said at least one disk drive arm physical parameters; and,
    (e) moving said disc drive arm within said nonlinear magnet field according to said determined control law.

2. A method of moving a disc drive arm in a nonlinear magnet field according to claim 1, wherein said disc drive arm is moved by a voice coil motor.

3. A method of moving a disc drive arm in a nonlinear magnetic field according to claim 2, wherein said at least one disk drive arm physical parameter is selected from a group consisting of a torque factor, an inertia, a coil resistance, and a coil inductance.

4. A method of moving a disc drive arm in a nonlinear magnetic field according to claim 1, wherein said functional form is a fifth order polynomial and said at least one parameters are six polynomial coefficients.

5. A method of moving a disc drive arm in a nonlinear magnetic field according to claim 4, wherein step (c) comprises the step of
 (c1) determining a value for each of said at least six polynomial coefficients by least squares curve fitting said torque bias, said fifth order polynomial at least approximately representing said torque bias when said determined values are substituted for each of said six polynomial coefficients.

6. A method of moving a disc drive arm in a nonlinear magnetic field according to claim 1, wherein said disc drive arm is in mechanical communication with and movable by a voice control motor, and wherein step (e) comprises the step of
 (e1) determining from said control law a voltage value, and,
 (e2) supplying a voltage approximately equal to said control law voltage value to said voice controlled motor, thereby moving said disc drive arm within said nonlinear magnet field according to said determined control law.

7. A method of moving a disc drive arm in a nonlinear magnetic field according to claim 6, wherein said functional form is a fifth order polynomial and said at least one parameters are six polynomial coefficients.

8. A method of moving a disc drive arm in a nonlinear magnetic field according to claim 7, wherein step (c) comprises the step of
 (c1) determining a value for each of said at least six polynomial coefficients by least squares curve fitting said torque bias, said fifth order polynomial at least approximately representing said torque bias when said determined values are substituted for each of said six polynomial coefficients.

9. An adaptive method of moving a disc drive arm in a nonlinear magnetic field, wherein is provided at least one disk drive arm physical parameter, comprising the steps of:
 (a) determining a torque bias of said disc drive arm within said magnetic field;
 (b) selecting a functional form, said functional form having at least one parameter associated therewith;
 (c) determining a value for each of said at least one parameters, said functional form at least approximately representing said torque bias when said determined values are substituted for each of said at least one parameters;
 (d) determining a control law using at least said functional form, said determined values of said parameters, and said at least one disk drive arm physical parameters;
 (e) moving said disc drive arm within said nonlinear magnetic field according to said determined control law;
 (f) determining a value representative of an error in said disc drive arm move;
 (g) correcting at least one of said at least one determined parameter values associated with said functional form according to said value representative of an error in said disc drive arm move;
 (h) modifying said control law according to said corrected determined parameter values associated with said functional form; and,
 (i) moving said disc drive arm within said nonlinear magnetic field according to said modified control law.

10. A method of moving a disc drive arm in a nonlinear magnet field according to claim 9, wherein said disc drive arm is moved by a voice coil motor.

11. A method of moving a disc drive arm in a nonlinear magnetic field according to claim 9, wherein said at least one disk drive arm physical parameter is selected from a group consisting of a torque factor, an inertia, a coil resistance, and a coil inductance.

12. A method of moving a disc drive arm in the presence of a nonlinear restorative force, wherein is provided at least one disk drive arm physical parameter, comprising the steps of:
 (a) determining a torque bias of said disc drive arm when it is under the influence of said restorative force;
 (b) selecting a functional form, said functional form having at least one parameter associated therewith;
 (c) determining a value for each of said at least one parameters of said functional form, said functional form at least approximately representing said torque bias when said determined parameter values are substituted for each of said at least one parameters;
 (d) determining a control law using at least said functional form, said determined parameter values of said parameters, and said at least one disk drive arm physical parameters; and,
 (e) moving said disc drive arm within in the presence of said nonlinear restorative field according to said determined control law.

13. A method of moving a disc drive arm in the presence of a nonlinear restorative force according to claim 12, wherein said disc drive arm is moved by a voice coil motor.

14. A method of moving a disc drive arm in the presence of a nonlinear restorative force according to claim 12, wherein said at least one disk drive arm physical parameter is selected from a group consisting of a torque factor, an inertia, a coil resistance, and a coil inductance.

15. A method of moving a disc drive arm in the presence of a nonlinear restorative force according to claim 12, wherein said functional form is a fifth order polynomial and said at least one parameters are six polynomial coefficients.

16. A method of moving a disc drive arm in the presence of a nonlinear restorative force according to claim 15, wherein step (c) comprises the step of
 (c1) determining a value for each of said at least six polynomial coefficients by least squares curve fitting said torque bias, said fifth order polynomial at least approximately representing said torque bias when said determined values are substituted for each of said six polynomial coefficients.

17. A method of moving a disc drive arm in the presence of a nonlinear restorative force according to claim 12, wherein said disc drive arm is in mechanical communication with and movable by a voice controlled motor, and wherein step (e) comprises the step of
 (e1) determining from said control law a voltage value, and,
 (e2) supplying a voltage approximately equal to said control law voltage value to said voice controlled motor, thereby moving said disc drive arm in the presence of said nonlinear restorative force according to said determined control law.

\* \* \* \* \*